United States Patent
Wang et al.

(10) Patent No.: US 7,778,364 B2
(45) Date of Patent: Aug. 17, 2010

(54) SIGNAL STRENGTH ESTIMATION SYSTEM AND METHOD

(75) Inventors: Chih-Chiu Wang, Taipei County (TW); Huoy-Bing Lim, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 574 days.

(21) Appl. No.: 11/828,587

(22) Filed: Jul. 26, 2007

(65) Prior Publication Data

US 2009/0028228 A1    Jan. 29, 2009

(51) Int. Cl.
*H03D 1/00* (2006.01)
*H04L 27/06* (2006.01)

(52) U.S. Cl. .................... 375/343; 375/362; 375/150; 375/299; 375/267; 375/340; 370/335; 370/342

(58) Field of Classification Search .................. 375/343, 375/224, 340, 362, 142, 150, 299, 267; 370/335, 370/342
See application file for complete search history.

(56) References Cited

U.S. PATENT DOCUMENTS

2001/0021236 A1 * 9/2001 Song .......................... 375/366

* cited by examiner

*Primary Examiner*—Phuong Phu
(74) *Attorney, Agent, or Firm*—Thomas, Kayden, Horstemeyer & Risley

(57) ABSTRACT

A signal strength estimation circuit for a code division multiple access system comprises a channel compensator, a demodulator, an extractor and an average circuit. The channel compensator compensates different channel effect upon a received signal and outputs first and second compensated signals wherein the received signal comprises a first signal and a second signal. The demodulator electrically connected to the channel compensator demodulates the first and second compensated signals and outputs first and second demodulated signals wherein the demodulator demodulates the first and second compensated signals by corresponding 4 bits pilot patterns when each of the first and second compensated signals only has 2 pilot bits in a slot and the second signal is obtained by space time transmit diversity encoding the first signal. The extractor coupled to the demodulator respectively extracts first and second pilot signals from the first and second demodulated signals. The average circuit coupled to the extractor averages the first and second pilot signals, thereby obtaining a signal strength estimation.

20 Claims, 7 Drawing Sheets

STTD encoded symbols for antenna 1 and antenna 2.

| $N_{pilot}=2$ | $N_{pilot}=4$ (*1) | | $N_{pilot}=8$(*2) | | | | $N_{pilot}=16(*3)$ | | | | | | | |
|---|---|---|---|---|---|---|---|---|---|---|---|---|---|---|
| Symbol # Slot #0 | 0 | 0 | 1 | 0 | 1 | 2 | 3 | 0 | 1 | 2 | 3 | 4 | 5 | 6 | 7 |
| 1 | 11 | 11 | 11 | 11 | 11 | 11 | 10 | 11 | 11 | 11 | 10 | 11 | 11 | 11 | 11 |
| 2 | 00 | 11 | 00 | 11 | 00 | 11 | 10 | 11 | 00 | 11 | 10 | 11 | 10 | 11 | 11 |
| 3 | 01 | 11 | 01 | 11 | 01 | 11 | 01 | 11 | 01 | 11 | 01 | 11 | 01 | 11 | 11 |
| 4 | 00 | 11 | 00 | 11 | 00 | 11 | 01 | 11 | 00 | 11 | 01 | 11 | 01 | 11 | 11 |
| 5 | 10 | 11 | 10 | 11 | 10 | 11 | 00 | 11 | 10 | 11 | 00 | 11 | 10 | 11 | 11 |
| 6 | 11 | 11 | 11 | 11 | 11 | 11 | 00 | 11 | 11 | 11 | 00 | 11 | 00 | 11 | 11 |
| 7 | 10 | 11 | 10 | 11 | 10 | 11 | 10 | 11 | 10 | 11 | 10 | 11 | 10 | 11 | 11 |
| 8 | 01 | 11 | 01 | 11 | 01 | 11 | 11 | 11 | 01 | 11 | 11 | 11 | 00 | 11 | 11 |
| 9 | 11 | 11 | 11 | 11 | 11 | 11 | 11 | 11 | 11 | 11 | 11 | 11 | 01 | 11 | 11 |
| 10 | 01 | 11 | 01 | 11 | 01 | 11 | 00 | 11 | 01 | 11 | 00 | 11 | 01 | 11 | 11 |
| 11 | 10 | 11 | 10 | 11 | 10 | 11 | 11 | 11 | 10 | 11 | 11 | 11 | 10 | 11 | 11 |
| 12 | 00 | 11 | 00 | 11 | 00 | 11 | 00 | 11 | 00 | 11 | 00 | 11 | 01 | 11 | 11 |
| 13 | 10 | 11 | 10 | 11 | 10 | 11 | 11 | 11 | 10 | 11 | 11 | 11 | 00 | 11 | 11 |
| 14 | 00 | 11 | 00 | 11 | 00 | 11 | 11 | 11 | 00 | 11 | 11 | 11 | 10 | 11 | 11 |

SIGNAL STRENGTH ESTIMATION SYSTEM AND METHOD

BACKGROUND OF THE INVENTION

1. Field of the Invention

The invention relates to signal strength estimation in code division multiple access (CDMA) systems, and more particularly to signal strength estimation in CDMA systems.

2. Description of the Related Art

A conventional mobile communication system, such as a time division multiple access (TDMA) system or a frequency division multiple access (FDMA) system, is used to share a limited communication resource with multiple users. However, in response to growing demand for efficient use of frequency spectrum, attention is directed to a code division multiple access (CDMA) system as a multiplexing system. The CDMA system is a technique for simultaneously carrying out a plurality of communications by using signals in a same frequency band by means of the spread spectrum technique. Today, CDMA technique is very popular in wireless communication realized by various standard groups, especially in third generation communication systems such as 3GPP and 3GPP2. For a CDMA receiver, pilot channel signal sent from CDMA transmitter shall be acquired and correlated with corresponding traffic channels.

The signal to interference ratio (SIR) estimation is an important technique for CDMA receivers. In a CDMA receiver, many modem components utilize the estimated SIR result as a comparison threshold factor or as a decoding parameter, for components such as Turbo Decoder and Power control. Especially at power control, the SIR estimation error is closely related to the power control error and therefore is directly related to the service capacity. Better SIR estimation improves system performance, which relies on more precise interference and signal strength estimation.

In order to improve performance, pilot signal could be transmitted in space time diversity mode. In some cases, the pilot signals may be transmitted from more than one antenna in space time block coding based transmit diversity (STTD) mode. FIG. 1 is a block diagram of signal strength estimation circuit 100 of conventional CDMA systems by the use of dedicated physical control channel (DPCCH) pilot field. The signal strength estimation circuit 100 comprises a channel compensator 110, a space time transmit diversity decoder 120, a demodulator 130, and an average circuit 140. The channel compensator 110 compensates channel effect of received signal R. The STTD decoder 120 decodes the received signal R in a special case when the received signal R only has 2 pilot bits in a slot and comprises a first signal and a second signal obtained by STTD encoding the first signal, or directly outputs the received signal R otherwise. The demodulator 130 demodulates the received signal R by known pilot patterns. The average circuit 140 averages the received signal R to obtain the signal strength.

As an example, version 4.6 of 3GPP specification 25.211 could be used here to teach conventional application of STTD technique. A block diagram of a generic STTD encoder is shown in the FIG. 2. The STTD encoder operates on 4 symbols $b_0$, $b_1$, $b_2$, $b_3$ as shown in FIG. 2. In other words, it implies that STTD encoding shall be applied on a set of 4 symbols. There is no possibility to encode two symbols in STTD mode. Various physical channels could be transmitted in STTD mode, including various pilot channels.

FIG. 3 shows a special signal format transmitted from a CDMA transmitter. In FIG. 3, a first signal S1 transmitted by antenna 1 and a second signal S2 transmitted by antenna 2, and the second signal S2 is obtained by STTD encoding the first signal S1. In an example, the transmitted signal is mixed with data channel and pilot channel. The signal could be divided into frames, and each frame could be further divided into slots. In order to keep integrity of each slot, all symbols within a slot shall be modulated and encoded in the same way. It should be noted that 2 pilot bits of the second signal S2 are transmitted before the last 2 bits of data field, since STTD encoding needs to apply on 4 bits. Thus the receiver end cannot distinguish 2 pilot bits from the last 2 bits of data field in the special signal format without STTD decoding first because the last 2 bits of data field is unknown for the receiver end. Therefore, the STTD decoder 120 decodes the received signal R to get the 2 pilot bits only in a first iteration. Besides, the receiver end shall store this time slot and decode the data bits using decoded pilot bits later. Additional logic, memory space, computing resource, and time would be consumed to decode the data bits later. In this regards, the STTD decoder 120 applies only to the special signal format and STTD decoding is complicated, increasing costs and operation complexity.

Methods and apparatuses providing generalized signal strength estimation and preventing STTD decoding are thus desirable.

BRIEF SUMMARY OF INVENTION

The invention provides signal strength estimation circuits and methods for estimating signal strength of a received signal.

A signal strength estimation circuit for a code division multiple access system comprises a channel compensator, a demodulator, an extractor and an average circuit. The channel compensator compensates different channel effects on a received signal and outputs first and second compensated signals wherein the received signal comprises a first signal and a second signal. The demodulator electrically connected to the channel compensator demodulates the first and second compensated signals and outputs first and second demodulated signals wherein the demodulator demodulates the first and second compensated signals by corresponding 4 bits pilot patterns when each of the first and second compensated signals only has 2 pilot bits in a slot and the second signal is obtained by space time transmit diversity encoding the first signal. The extractor coupled to the demodulator respectively extracts first and second pilot signals from the first and second demodulated signals. The average circuit coupled to the extractor averages the first and second pilot signals, thereby obtaining a signal strength estimation.

The corresponding 4 bits pilot patterns are defined by a specification of dedicated physical control channel with 4 pilot bits in the code division multiple access system.

The extractor comprises a first circuit and a second circuit. The first circuit extracts an odd symbol of the slot from the first demodulated signal as the first pilot signal when each of the first and second signals only has 2 pilot bits in a slot and the second signal is obtained by space time transmit diversity encoding the first signal, or directly outputs the first demodulated signal as the first pilot signal. The second circuit extracts an even symbol of the slot from the second demodulated signal and conjugates the even symbol as the second pilot signal when each of the first and second compensated signals only has 2 pilot bits in a slot and the second signal is obtained by space time transmit diversity encoding the first signal, or directly outputs the second demodulated signal as the second pilot signal otherwise.

The first circuit comprises a first down-sample circuit, a second down-sample circuit, a second conjugating circuit and a second switch. The first down-sample circuit coupled to the demodulator extracts the odd symbol of the slot from the first demodulated signal. The second down-sample circuit coupled to the demodulator extracts the even symbol of the slot from the second demodulated signal. The second conjugating circuit coupled to the second down-sample circuit conjugates the even symbol. The second switch selectively coupled to the second conjugating circuit or to the second down-sample circuit switches different operation.

Alternatively, an extractor comprises a first circuit and a second circuit. The first circuit extracts an odd symbol of the slot from the first demodulated signal and conjugates the odd symbol as the first pilot signal when each of the first and second compensated signals only has 2 pilot bits in a slot and the second signal is obtained by space time transmit diversity encoding the first signal or directly outputs the first demodulated signal as the first pilot signal otherwise. The second circuit extracts an even symbol of the slot from the second demodulated signal as the second pilot signal when each of the first and second compensated signals only has 2 pilot bits in a slot and the second signal is obtained by space time transmit diversity encoding the first signal, or directly outputs the second demodulated signal as the second pilot signal otherwise.

Alternatively, the first circuit comprises a first down-sample circuit, a first conjugating circuit and a first switch. The first down-sample circuit coupled to the demodulator extracts the odd symbol of the slot from the first demodulated signal. The first conjugating circuit coupled to the first down-sample circuit conjugates the odd symbol. The first switch selectively coupled to the first conjugating circuit or to the first down-sample circuit switches different operations. The second circuit comprises a second down-sample circuit coupled to the demodulator for extracting the even symbol of the slot from the first demodulated signal.

In one aspect, a method for demodulating pilot signal from received space time transmit diversity (STTD) signal comprise providing a table for 4-bit pilot patterns, determining number of pilot bits of a first and a second signals if the second signal is obtained by STTD encoding the first signal, and demodulating the first and the second signals by using the table in response to the number of pilot bits is determined as 2.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4A is a table showing pilot bit patterns for downlink dedicated physical control channel (DPCCH) for antenna 1 according to a specification of DPCCH in code division multiple access systems (CDMA).

FIG. 4B is a table showing pilot bit patterns of down link DPCCH for antenna 2 using space time transmit diversity (STTD) according to a specification of DPCCH in CDMA.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims. 1111

Figure 4B:
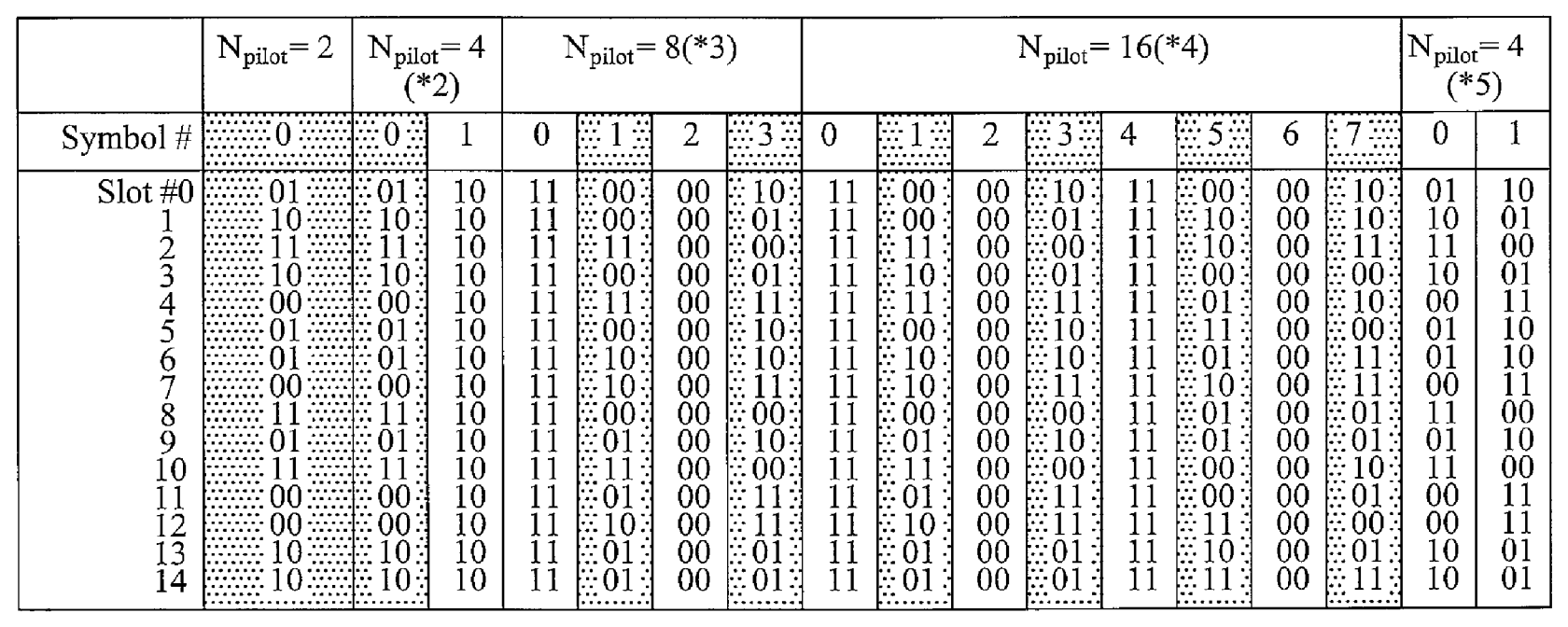

FIG. 4A is a table showing pilot bit patterns for downlink dedicated physical control channel (DPCCH) for antenna 1 according to a specification (ex: 3GPP spec. 25.211) of DPCCH in code division multiple access systems (CDMA). FIG. 4B is a table showing pilot bit patterns of down link DPCCH for antenna 2 using space time transmit diversity (STTD) according to the specification of DPCCH in CDMA. In FIG. 4A, pilot bit patterns for antenna 1 with $N_{pilot}=2$ (i.e. Symbol# 0) are the same with a shaded area of pilot bit patterns with $N_{pilot}=4$ (i.e. odd Symbol# 1). Similarly, in FIG. 4B, pilot bit patterns for antenna 2 with $N_{pilot}=2$ (i.e. Symbol 0) are the same with a shaded area of pilot bit patterns with $N_{pilot}=4$ (i.e. even Symbol# 0). $N_{pilot}$ is the number of pilot bits in one slot of a received signal. Thus, when $N_{pilot}=2$, we can demodulate a special case $N_{pilot}=2$ under STTD mode as a general case $N_{pilot}=4$ and extract the pilot bit patterns for executing general signal strength estimation to prevent complicated STTD decoding.

Figure 5:
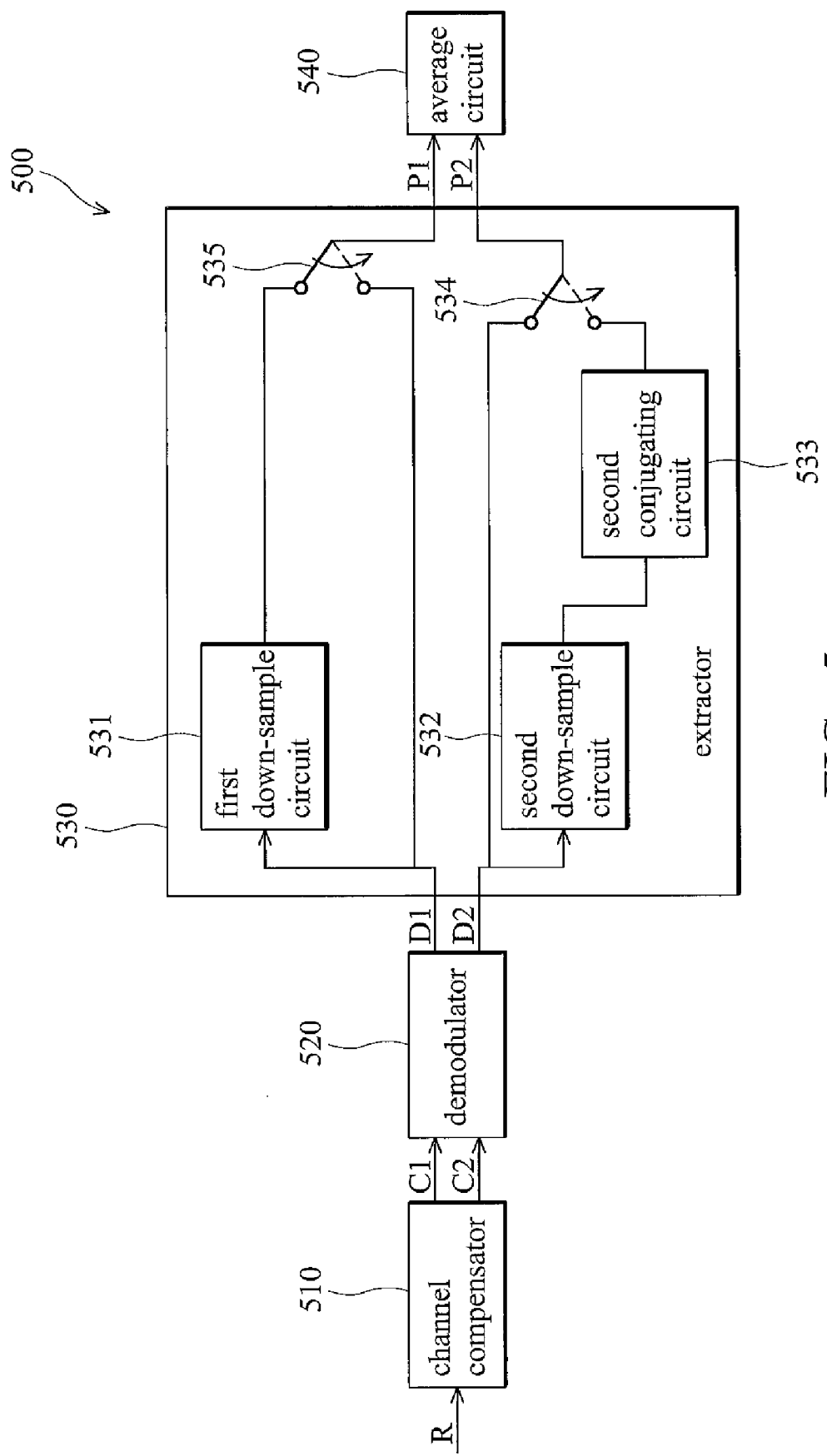
FIG. 5 is a block diagram showing a signal strength estimation circuit 500 according to an embodiment of the invention.

FIG. 5 is a block diagram showing a signal strength estimation circuit 500 according to an embodiment of the invention. The signal strength estimation circuit 500 comprises a channel compensator 510, a demodulator 520, an extractor 530 and an average circuit 540. Wherein the extractor 530 comprises a first down-sample circuit 531, a first switch 535, a second down-sample circuit 532, a second conjugating circuit 533 and a second switch 534.

The channel compensator 510 compensates different channel effect upon a received signal R, and outputs first and second compensated signals C1 and C2. When $N_{pilot}=2$ under STTD mode, taking $h_1$ and $h_2$ are channel effect for antenna 1 and 2. Supposing X is the previous symbol (2 bits) of data and Z is the pilot symbol (2 bits), the first signal (X, Z) is transmitted by antenna 1 at time $(t_0, t_1)$. The second signal $(-Z^*, X^*)$ is transmitted by antenna 2 at time $(t_0, t_1)$. The second signal $(-Z^*, X^*)$ is obtained by STTD encoding the first signal (X, Z). Thus, the received signal $R=(R_0, R_1)$ is:

$R_0 = Xh_1 - Z^*h_2$, at $t=t_0$;
$R_1 = Zh_1 + X^*h_2$, at $t=t_1$ $R_0, R_1$ is the received signal R at time $t_0, t_1$, respectively. For compensating different channel effect upon the received signal R, the channel compensator 510 multiplies inverse channel effects $h_1^*$ and $h_2^*$ corresponding to $h_1$ and $h_2$ by the received signal R and outputs the first compensated signal $C1=Rh_1^*$ and second compensated signal $C2=Rh_2^*$.

$C1 = Rh_1^* = (R_0 h_1^*, R_1 h_1^*) = (C1_0, C1_1)$,
$C2 = Rh_2^* = (R_0 h_2^*, R_1 h_2^*) = (C2_0, C2_1)$,
$C1_0 = R_0 h_1^* = X|h_1|^2 - Z^*h_2 h_1^*$,   $C2_0 = R_0 h_2^* = Xh_1 h_2^* - Z^*|h_2|^2$,
$C1_1 = R_1 h_1^* = Z|h_1|^2 + X^*h_2 h_1^*$,   $C2_1 = R_1 h_2^* = Zh_1 h_2^* + X^*|h_2|^2$, $C1_0$ is obtained by compensating $R_0$ for channel effect $h_1$. $C1_1$ is obtained by compensating $R_1$ for channel effect $h_1$. $C2_0$ is obtained by compensating $R_0$ for channel effect $h_2$. $C2_1$ is obtained by compensating $R_1$ for channel effect $h_2$. When $N_{pilot}=2$, the demodulator 520, electrically connected to the channel compensator 510, demodulates the first and second compensated signals C1 and C2 by corresponding pilot bit patterns according to the specification of DPCCH with 4 pilot bits ($N_{pilot}=4$) in CDMA systems (referring to FIGS. 4A-B), and outputs a first demodulated signal D1 and second demodulated signal D2. It should be noted that when $N_{pilot}=2$ under STTD mode, the demodulator 520 decodes the received signal R as $N_{pilot}=4$ under STTD mode. For example, the first and second compensated signals C1 and C2 are transmitted in slot 0, the demodulator 520 demodulates first compensated signal C1 by conjugated pilot bit patterns of symbol 0 in slot 0 for antenna 1 with $N_{pilot}=4$ and demodulates second compensated signal C2 by conjugated pilot bit patterns of symbol 0 in slot 0 for antenna 2 with $N_{pilot}=4$. Assume pilot bit patterns for $N_{pilot}=4$ are (A, Z) for antenna 1, and pilot bit patterns for $N_{pilot}=4$ are ($-Z^*$, $A^*$) for antenna 2. After demodulating, the first demodulated signal D1=($D1_0$, $D1_1$) and the second demodulated signal D2=($D2_0$, $D2_1$) are:

$D1_0 = C1_0 A^* = X|h_1|^2 A^* - Z^* h_2 h_1^* A^*$, $D2_0 = -C2_0 Z = -X h_1 h_2^* Z + |Z|^2 |h_2|^2$, $D1_1 = C1_1 Z^* = |Z|^2 |h_1|^2 + X^* h_2 h_1^* Z^*$, $D2_1 = C2_1 A = Z h_1 h_2^* A + X^* |h_2|^* A$, $D1_0$ is obtained by demodulating $C1_0$ by $A^*$. $D2_0$ is obtained by demodulating $C2_0$ by $-Z$. $D1_1$ is obtained by demodulating $C1_1$ by $Z^*$. $D2_1$ is obtained by demodulating $C2_1$ by A. The extractor 530 coupled to the demodulator 520 respectively extracts a first pilot signal P1 and second pilot signal P2 from the first and second demodulated signals D1 and D2. It should be noted that in the general case $N_{pilot}=4$, 8 and 16, pilot signals exist only in first and second demodulated signals, and the extractor 530 outputs the first and second demodulated signals directly by switching first switch 535 and second switch 534. In the special case $N_{pilot}=2$ under STTD mode, data signals exist in the first and second demodulated signals D1 and D2.

Figure 1:
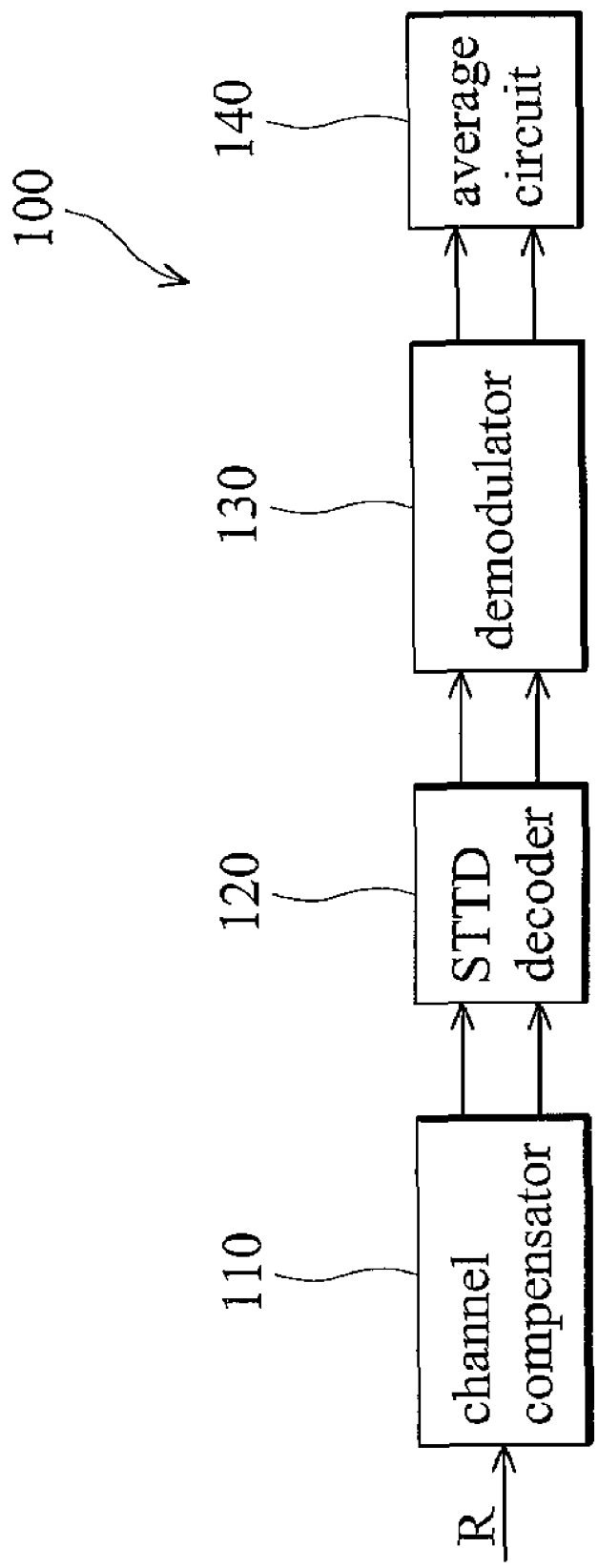
FIG. 1 is a block diagram of conventional signal strength estimation circuit 100 of CDMA systems by the use of dedicated physical control channel (DPCCH) pilot field.
Figure 2:
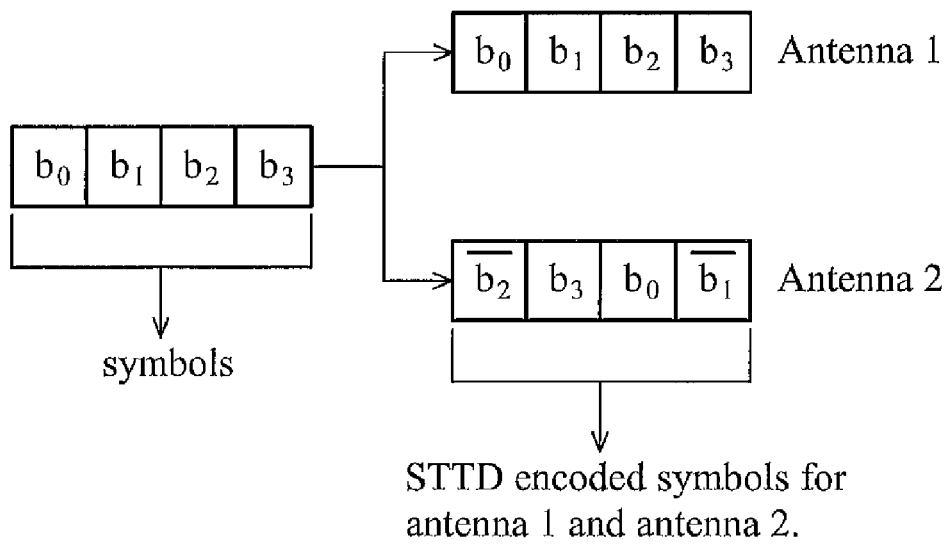
FIG. 2 is a block diagram depicting space time block coding based transmit diversity (STTD) mode.
Figure 3:
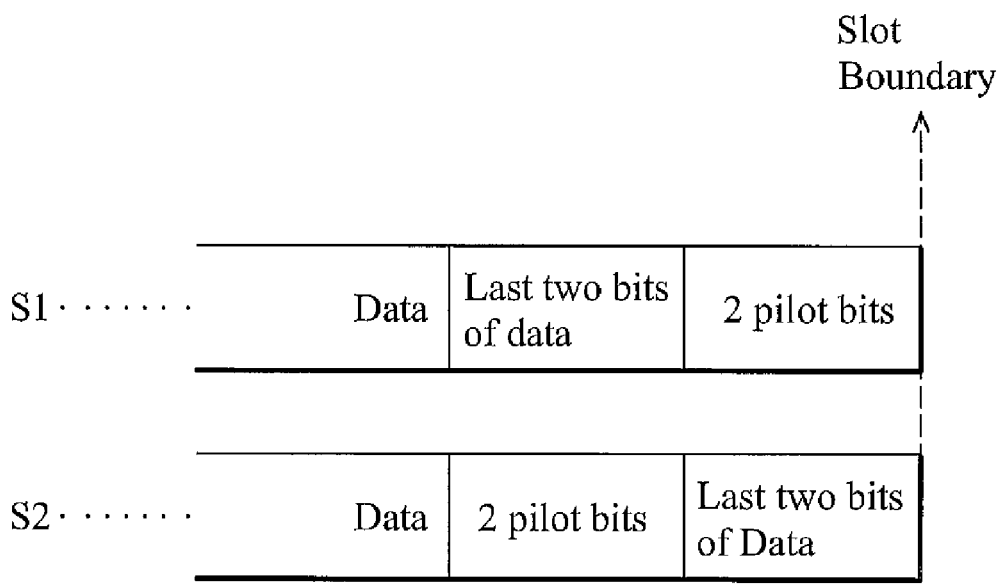
FIG. 3 shows a special signal format transmitted from a CDMA transmitter.

In the special case $N_{pilot}=2$ under STTD mode, the first switch 535 is coupled to the first down-sample circuit 531. The first down-sample circuit 531 extracts an odd symbol of the slot from the first demodulated signal D1 corresponding to the shaded area of pilot bit patterns with $N_{pilot}=4$ (referring to FIG. 3A). The second switch 534 is coupled to the second conjugating circuit 533. The second down-sample circuit 532 coupled to the demodulator 520 extracts an even symbol of the slot from the second demodulated signal D2 corresponding to the shaded area of pilot bit patterns with $N_{pilot}=4$ (referring to FIG. 3B). The second conjugating circuit 533 coupled to the second down-sample circuit 532 conjugates the even symbol. In other case, the first switch 535 and the second switch 534 are coupled to the demodulator 520 for directly outputting the first and second demodulated signals.

The average circuit 540 coupled to the extractor 530 averages the first and second pilot signals P1 and P2.

$$D2_0^* + D1_1 = -X^* h_2 h_1^* Z^* + |Z|^2 |h_2|^2 + |Z|^2 |h_1|^2 + X^* h_2 h_1^* Z^*$$

$$= |Z|^2 (|h_1|^2 + |h_2|^2)$$

The output signal of the average circuit 540 is the desired pilot signal strength for signal strength estimation.

Figure 6:
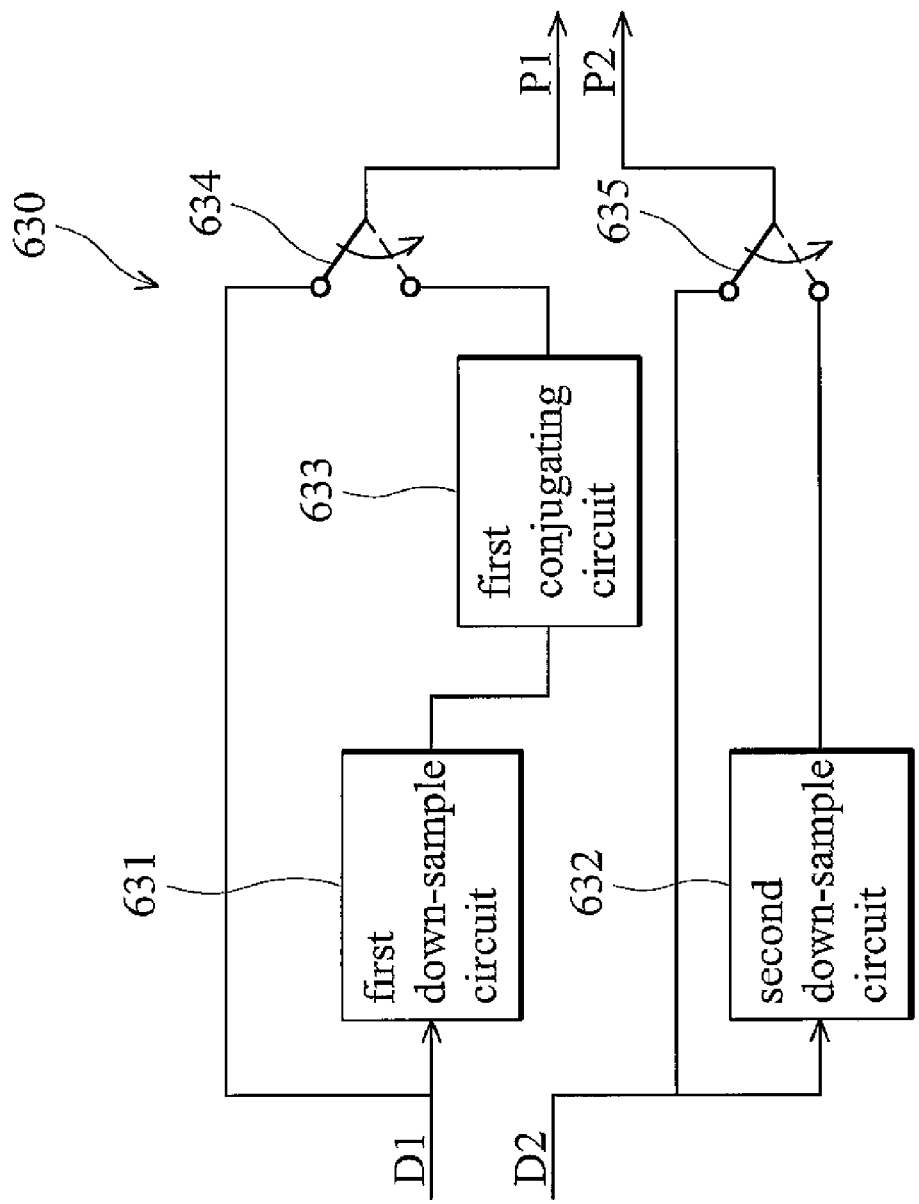
FIG. 6 shows an extractor 630 according to another embodiment of the invention.

Alternatively, the extractor 530 can be replaced by another extractor 630. FIG. 6 shows an extractor 630 according to another embodiment of the invention. The extractor 630 comprises a first down-sample circuit 631, a second down-sample circuit 632, a fourth switch 635 a first conjugating circuit 633 and a third switch 634. The extractor 630 coupled to the demodulator 520 respectively extracts a first pilot signal P1 and second pilot signal P2 from the first and second demodulated signals D1 and D2.

In the special case $N_{pilot}=2$ under STTD mode, the third switch 634 is coupled to the first conjugating circuit 633. The first down-sample circuit 631 coupled to the demodulator 520 extracts an odd symbol of the slot from the first demodulated signal D1. The fourth switch is coupled to the second down-sample circuit 632. The second down-sample circuit 632 coupled to the demodulator 520 extracts an even symbol of the slot from the second demodulated signal D2. The first conjugating circuit 633 coupled to the first down-sample circuit 631 conjugates the odd symbol. In other case, the third switch 634 and the fourth switch 635 are coupled to the demodulator 520 for directly outputting the first and second demodulated signals.

The average circuit 540 coupled to the extractor 630 averages the first and second pilot signals P1 and P2.

$$D2_0 + D1_1^* = -X^* h_2 h_1^* Z^* + |Z|^2 |h_2|^2 + |Z|^2 |h_1|^2 + X^* h_2 h_1^* Z^*$$

$$= |Z|^2 (|h_1|^2 + |h_2|^2)$$

The output signal of the average circuit 540 is desired pilot signal strength for signal strength estimation.

Figure 7:
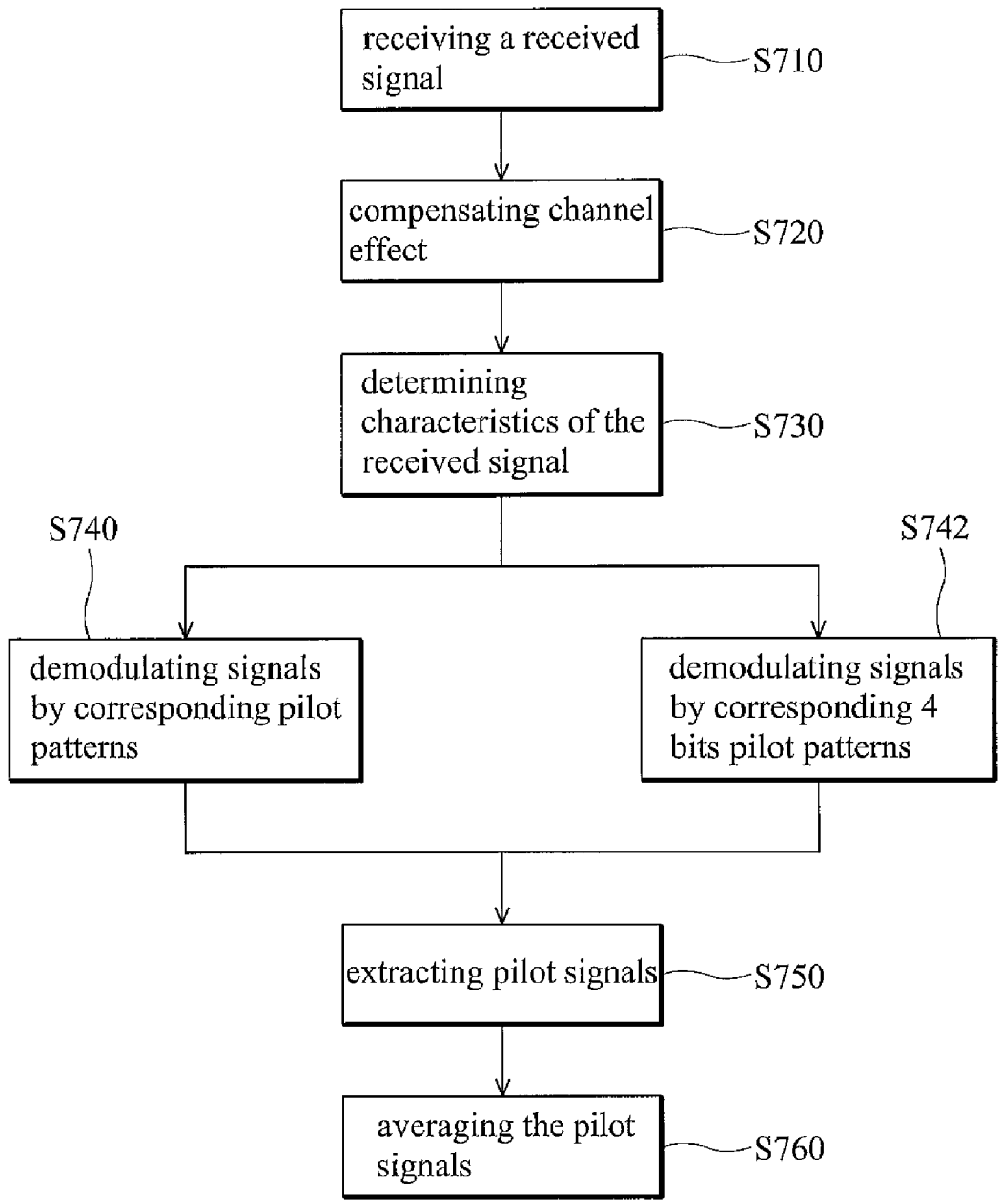
FIG. 7 is a flowchart illustrating signal strength estimation method 700 according to another embodiment of the invention.

FIG. 7 is a flowchart illustrating signal strength estimation method 700 according to another embodiment of the invention. The signal strength estimation method 700 comprises receiving a received signal in step S710, compensating channel effect in step S720, determining characteristics of the received signal in step S730, demodulating signals by corresponding pilot patterns in step S740, demodulating signals by corresponding 4 bits pilot patterns in step S742, extracting pilot signals in step S750 and averaging the pilot signals in step S760.

In step S710 the received signal transmitted from DPCCH of the CDMA system consists of a first signal and a second signal. In step S720 channel effect upon the first signal and the second signal is compensated, and first and second compensated signals are output. In step S730, the number of pilot bits in a slot of the received signal is calculated and it is determined whether the second signal STTD is encoded from the first signal.

According to the result of step S730, when each of the first and second signals only has 2 pilot bits in a slot and the second signal is STTD encoded from the first signal, step S742 is executed, otherwise step S740 is executed, in which signals of corresponding pilot patterns demodulate the first and second compensated signals based on a specification of DPCCH in the CDMA system (referring to FIGS. 4A-B) and first and second demodulated signals are output. In step S742, corresponding 4 bit pilot patterns demodulate the first and second compensated signals based on a specification of DPCCH with 4 pilot bits in the CDMA system (referring to FIGS. 4A-B) and first and second demodulated signals are output. In steps S740 and S742, slot number, symbol number, STTD mode, and number of pilot bits in a slot are taken in to account.

In step S750, first and second pilot signals are respectively extracted from the first and second demodulated signals. Step S750 may refer to actions of extractors 530 and 630. In step S760, the first and second pilot signals are averaged.

In one embodiment, a method for demodulating pilot signal from received space time transmit diversity (STTD) signal comprise providing a table for 4-bit pilot patterns, determining number of pilot bits of a first and a second signals if the second signal is obtained by STTD encoding the first signal, and demodulating the first and the second signals by using the table in response to the number of pilot bits is determined as 2. The corresponding 4-bit pilot patterns are defined by 3GPP specification 25.211 of dedicated physical control channel In this regards, the method may further comprises odd extracting an odd symbol of the slot from the first demodulated signal as a first pilot signal, or directly outputting the first demodulated signal as the first pilot signal otherwise. And the method may further comprises even extracting an even symbol of the slot from the second demodulated signal and conjugating the even symbol as a second pilot signal, or directly outputting the second demodulated signal as the second pilot signal otherwise. In such situation, only one of the odd extracting and the even extracting is directly outputting the first and the second demodulated signal in the same time.

Alternatively, the method may further comprises odd extracting an odd symbol of the slot from the first demodulated signal and conjugating the odd symbol as a first pilot signal, or directly outputting the first demodulated signal as the first pilot signal otherwise. And the method may further comprises even extracting an even symbol of the slot from the second demodulated signal as a second pilot signal, or directly outputting the second demodulated signal as the second pilot signal otherwise. In such situation, only one of the odd extracting and the even extracting is directly outputting the first and the second demodulated signal in the same time.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal strength estimation system for a code division multiple access system, comprising:
   a channel compensator, for compensating channel effect upon a received signal and outputting first and second compensated signals,
   wherein the received signal comprises a first signal and a second signal, and wherein the second signal is obtained by space time transmit diversity (STTD) encoding the first signal;
   a demodulator, coupled to the channel compensator, for demodulating the first and second compensated signals by corresponding 4-bit pilot patterns when each of the first and second compensated signals having 2 pilot bits and outputting first and second demodulated signals;
   an extractor, coupled to the demodulator, for respectively extracting first and second pilot signals from the first and second demodulated signals; and
   an average circuit, coupled to the extractor, for averaging the first and second pilot signals, thereby obtaining a signal strength estimation.

2. The signal strength estimation system of claim 1, wherein the corresponding 4-bit pilot patterns are defined by 3GPP specification 25.211 of dedicated physical control channel with 4 pilot bits in the code division multiple access system.

3. The signal strength estimation system of claim 1, wherein the extractor comprises:
   a first circuit, for extracting an odd symbol from the first demodulated signal as the first pilot signal when each of the first and second compensated signals only has 2 pilot bits, or for directly outputting the first demodulated signal as the first pilot signal otherwise; and
   a second circuit, for extracting an even symbol from the second demodulated signal and conjugating the even symbol as the second pilot signal when each of the first and second compensated signals only has 2 pilot bits, or for directly outputting the second demodulated signal as the second pilot signal otherwise.

4. The signal strength estimation system of claim 1, wherein the extractor comprises:
   a first circuit, for extracting an odd symbol from the first demodulated signal and conjugating the odd symbol as the first pilot signal when each of the first and second compensated signals only has 2 pilot bits, or directly outputting the first demodulated signal as the first pilot signal otherwise; and
   a second circuit, for extracting an even symbol from the second demodulated signal as the second pilot signal when each of the first and second compensated signals only has 2 pilot bits, or for directly outputting the second demodulated signal as the second pilot signal otherwise.

5. The signal strength estimation system of claim 3,
   wherein the first circuit comprises:
   a first down-sample circuit, coupled to the demodulator for extracting the odd symbol from the first demodulated signal; and
   a first switch, selectively coupled to the first down sample circuit or to the demodulator, for switching between operations,
   wherein the second circuit comprises:
   a second down-sample circuit, coupled to the demodulator for extracting the even symbol from the second demodulated signal,
   a second conjugating circuit, coupled to the second down-sample circuit for conjugating the even symbol; and
   a second switch, selectively coupled to the second conjugating circuit or to the demodulator, for switching between operations.

6. The signal strength estimation system of claim 4,
   wherein the first circuit comprises:
   a third down-sample circuit, coupled to the demodulator for extracting the odd symbol from the first demodulated signal,
   a first conjugating circuit, coupled to the first down-sample circuit for conjugating the odd symbol,
   a third switch, selectively coupled to the first conjugating circuit or to the demodulator, for switching between operations; and
   wherein the second circuit comprises:
   a fourth down-sample circuit, coupled to the demodulator for extracting the even symbol of a slot from the second demodulated signal; and
   a fourth switch, selectively coupled to the first down sample circuit or to the demodulator, for switching between operations.

7. The signal strength estimation system of claim 3, wherein only one of the first circuit and the second circuit is directly outputting the first and the second demodulated signal in the same time.

8. The signal strength estimation system of claim 4, wherein only one of the first circuit and the second circuit is directly outputting the first and the second demodulated signal in the same time.

9. A signal strength estimation method for a code division multiple access system, comprising:
receiving a received signal of the code division multiple access system,
wherein the received signal comprises a first signal and a second signal,
compensating channel effect upon the first signal and the second signal, and outputting first and second compensated signals,
determining number of pilot bits in a slot of the first and second compensated signals and whether the second signal is obtained by space time transmit diversity encoding the first signal,
demodulating the first and second compensated signals, and outputting first and second demodulated signals, demodulating the first and second compensated signals by corresponding 4-bit pilot patterns when each of the first and second compensated signals only has 2 pilot bits in the slot if the second signal is obtained by space time transmit diversity encoding the first signal,
respectively extracting first and second pilot signals from the first and second demodulated signals; and
averaging the first pilot signal and the second pilot signal, thereby obtaining a signal strength estimation.

10. The signal strength estimation method of claim 9, wherein the corresponding 4-bit pilot patterns are defined by 3GPP specification 25.211 of dedicated physical control channel with 4 pilot bits in the code division multiple access system.

11. The signal strength estimation method of claim 9, wherein said extracting comprises:
odd extracting an odd symbol of the slot from the first demodulated signal as the first pilot signal when each of the first and second compensated signals only has 2 pilot bits in the slot, or directly outputting the first demodulated signal as the first pilot signal otherwise; and
even extracting an even symbol of the slot from the second demodulated signal and conjugating the even symbol as the second pilot signal when each of the first and second compensated signals only has 2 pilot bits in the slot, or directly outputting the second demodulated signal as the second pilot signal otherwise.

12. The signal strength estimation method of claim 9, wherein said extracting comprises:
odd extracting an odd symbol of the slot from the first demodulated signal and conjugating the odd symbol as the first pilot signal when each of the first and second compensated signals only has 2 pilot bits in the slot, or directly outputting the first demodulated signal as the first pilot signal otherwise; and
even extracting an even symbol of the slot from the second demodulated signal as the second pilot signal when each of the first and second compensated signals only has 2 pilot bits in the slot, or directly outputting the second demodulated signal as the second pilot signal otherwise.

13. The signal strength estimation method of claim 11, wherein the odd extracting step further comprising:
selectively outputting the odd symbol or directly outputting the first demodulated signal;
wherein the even extracting step further comprising:
selectively outputting the even symbol or directly outputting the second demodulated signal.

14. The signal strength estimation method of claim 12, wherein the odd extracting step further comprising:
selectively outputting the odd symbol or directly outputting the first demodulated signal;
wherein the even extracting step further comprising:
selectively outputting the even symbol or directly outputting the second demodulated signal.

15. The signal strength estimation method of claim 11, wherein only one of the odd extracting and the even extracting is directly outputting the first and the second demodulated signal in the same time.

16. The signal strength estimation method of claim 12, wherein only one of the odd extracting and the even extracting is directly outputting the first and the second demodulated signal in the same time.

17. A method for demodulating pilot signal from received space time transmit diversity (STTD) signal, comprising:
providing a table for 4-bit pilot patterns;
determining number of pilot bits of a first and a second signals if the second signal is obtained by STTD encoding a first signal;
demodulating the first and the second signals by using the table in response to the number of pilot bits is determined as 2;
odd extracting an odd symbol of the slot from the first demodulated signal as a first pilot signal, or directly outputting the first demodulated signal as the first pilot signal otherwise; and
even extracting an even symbol of the slot from the second demodulated signal and conjugating the even symbol as a second pilot signal, or directly outputting the second demodulated signal as the second pilot signal otherwise;
wherein only one of the odd extracting and the even extracting is directly outputting the first and the second demodulated signal in the same time.

18. The method of claim 17, wherein the corresponding 4-bit pilot patterns are defined by 3GPP specification 25.211 of dedicated physical control channel.

19. A method for demodulating pilot signal from received space time transmit diversity (STTD) signal, comprising:
providing a table for 4-bit pilot patterns;
determining number of pilot bits of a first and a second signals if the second signal is obtained by STTD encoding the first signal;
demodulating the first and the second signals by using the table in response to the number of pilot bits is determined as 2;
odd extracting an odd symbol of the slot from the first demodulated signal and conjugating the odd symbol as a first pilot signal, or directly outputting the first demodulated signal as the first pilot signal otherwise; and
even extracting an even symbol of the slot from the second demodulated signal as a second pilot signal, or directly outputting the second demodulated signal as the second pilot signal otherwise;
wherein only one of the odd extracting and the even extracting is directly outputting the first and the second demodulated signal in the same time.

20. The method of claim 19, wherein the corresponding 4-bit pilot patterns are defined by 3GPP specification 25.211 of dedicated physical control channel.

* * * * *